United States Patent
Furukawa et al.

(10) Patent No.: US 6,574,171 B1
(45) Date of Patent: Jun. 3, 2003

(54) SYSTEM FOR REPRODUCING RECORDING MEDIUMS

(75) Inventors: Kiyoshi Furukawa, Saitama-ken (JP); Hiroyuki Kobayashi, Saitama-ken (JP); Hidetsugu Kubota, Saitama-ken (JP); Takuya Abe, Saitama-ken (JP); Masakazu Takahashi, Saitama-ken (JP); Hideaki Watarihana, Saitama-ken (JP); Hiroki Goto, Saitama-ken (JP); Yoshimichi Nishio, Saitama-ken (JP); Yasutaka Suzuki, Saitama-ken (JP); Kazunori Matsuo, Saitama-ken (JP); Teruo Takahashi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/438,506

(22) Filed: Nov. 12, 1999

(30) Foreign Application Priority Data

Nov. 12, 1998 (JP) ............................................. 10-321705

(51) Int. Cl.$^7$ ............................................. G11B 17/04
(52) U.S. Cl. ................... 369/30.36; 369/53.18
(58) Field of Search .......................... 369/30.36, 53.18, 369/30.27, 30.32, 30.24

(56) References Cited

U.S. PATENT DOCUMENTS

| | | | | |
|---|---|---|---|---|
| 4,766,580 A | * | 8/1988 | Go et al. ..................... | 360/137 |
| 5,150,349 A | * | 9/1992 | Takai et al. .................... | 360/69 |
| 5,189,570 A | * | 2/1993 | Maeda et al. ............ | 360/251.4 |
| 5,321,687 A | * | 6/1994 | Kinoshita et al. ........... | 369/191 |
| 6,288,982 B1 | * | 9/2001 | Kato ....................... | 369/30.36 |

* cited by examiner

*Primary Examiner*—William Korzuch
*Assistant Examiner*—Jennifer M Dolan
(74) *Attorney, Agent, or Firm*—Arent Fox Kintner Plotkin & Kahn

(57) ABSTRACT

A first detector is provided for detecting an optical disc inserted in an opening of a reproducing system and for producing a first signal, and a second detector is provided on a reproducing device for detecting the disc carried to the device and for producing a second signal. A sensing circuit is provided for sensing a temporary reduction of a voltage of power supplied to the system and for producing a temporary reduction signal. A control means is provided to be responsive to the first signal and to the temporary reduction signal for operating a carrying device to carry the disc in an unloading direction, and in a loading direction when the disc reaches a predetermined position.

15 Claims, 12 Drawing Sheets

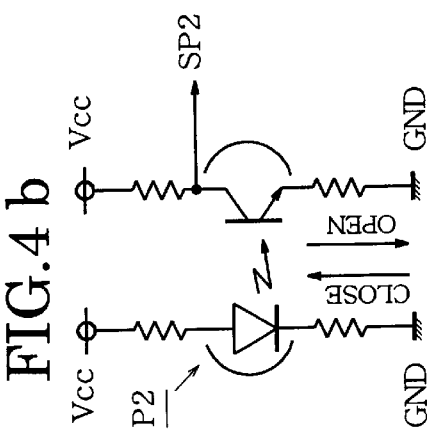
FIG.4 a
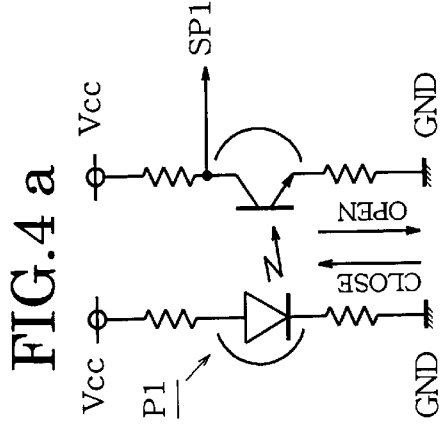
FIG.4 b
FIG.4 c
|  | CLOSE | OPEN |
|---|---|---|
| SP1 | H | L |
| SP2 | H | L |
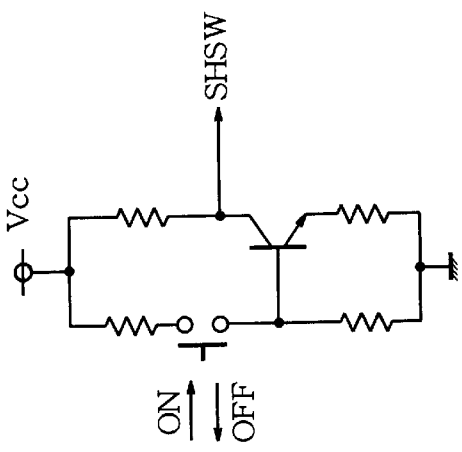
FIG.4 d
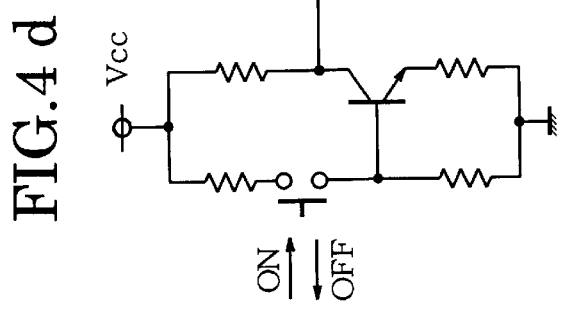
FIG.4 e
FIG.4 f
|  | OFF | ON |
|---|---|---|
| SPSW | H | L |
| SHSW | H | L |

SYSTEM FOR REPRODUCING RECORDING MEDIUMS

BACKGROUND OF THE INVENTION

The present invention relates to a system for reproducing a recording medium, and more particularly relates to a car CD player.

In the car CD player, when a user inserts a CD (compact disc) in an opening of the player, the CD is automatically carried in the player and mounted on a turntable of the player. When the user depresses an eject button, the CD is discharged.

The car CD can be operated by positioning the key switch at the ACC (accessory) if the engine is stopped. When the key switch is positioned at the START in order to start the engine, the power supply to the CD player is temporarily stopped so as to keep the rated voltage to the starter of the engine.

If the key switch is rotated to the START during the carrying of the CD to the turntable or to the opening, the CD may begin an unexpected operation or affect the carrying operation when the power is supplied to the CD player after the starting of the engine.

SUMMARY OF THE INVENTION

An object of the present invention is to provide a reproducing system which may properly continue to carry the CD after the starting of the engine.

According to the present invention, there is provided a system for reproducing a recording medium, the system having a reproducing device, a carrying device for carrying a recording medium inserted in an opening of the system to the reproducing device, the system comprising, a first detector for detecting the recording medium inserted in the opening and for producing a first signal, a second detector provided on the reproducing device for detecting the recording medium carried to the device and for producing a second signal, sensing means for sensing a temporary reduction of a voltage of power supplied to the system and for producing a temporary reduction signal, control means responsive to the first signal for operating the carrying device to carry the recording medium in a loading direction, and responsive to the first signal and to the temporary reduction signal for operating the carrying device to carry the recording medium in an unloading direction, and in a loading direction when the recording medium reaches a predetermined first position.

The control means is also responsive to disappearance of the second signal and to the temporary reduction signal for operating the carrying device to carry the recording medium in the loading direction, and in the unloading direction when the recording medium reaches a predetermined second position.

A third detector is provided at the predetermined first position for producing a third signal for carrying the recording medium in the loading direction when the recording medium reaches the third detector.

The third detector is disposed at a position inner than the first detector.

BRIEF DESCRIPTION OF DRAWINGS

FIGS. 4a to 4d are photodetectors;

FIGS. 4e and 4f are tables for explaining operation of the photodetector;

DETAILED DESCRIPTION OF THE PREFERRED EMBODIMENT

Figure 1:
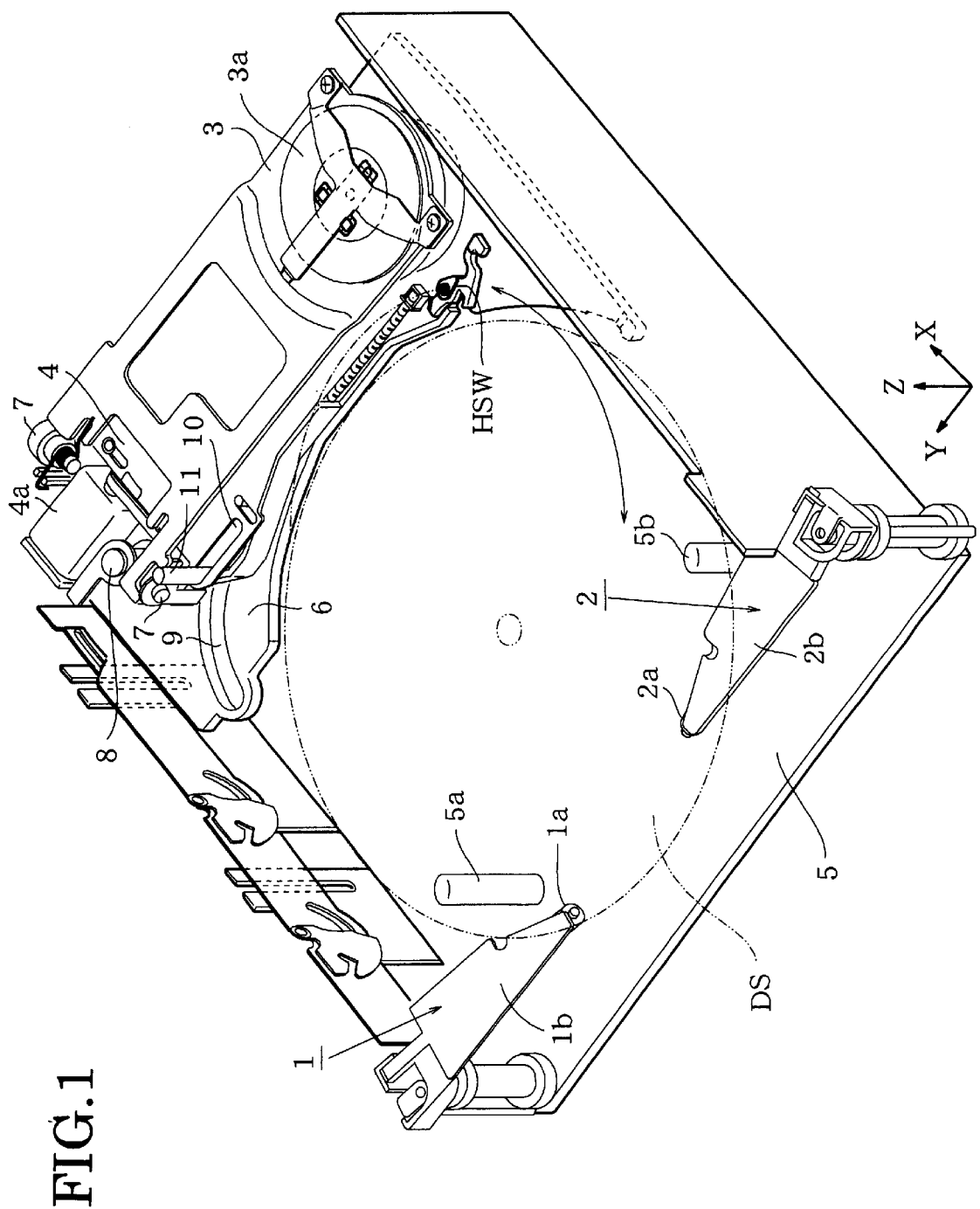
FIG. 1 is a perspective view showing a main part of a reproducing system mounted on a car.

Referring to FIG. 1, the system of the present invention has a pair of disc carrying mechanisms 1 and 2, a reproducing device 3, a pair of shafts 5a and 5b mounted on a fixed chassis 5.

The reproducing device 3 has a clamp mechanism 3, a pickup mechanism 4 mounted on a movable chassis 6.

The pickup mechanism 4 is horizontally rotatably mounted on the movable chassis 6 by a shaft 8 and vertically rotatably mounted on a shaft 7 on the chassis.

A drive pin 11 is engaged with a guide hole 9 of the movable chassis 6 and with an elongated hole 10 of the pickup mechanism 4. By moving the drive pin 11, the pickup mechanism 4 and the cramp mechanism 3 are rotated about the shaft 8.

A home switch HSW is provided on the pickup mechanism 4.

The clamp mechanism 3 has a circular hub 3a for clamping a disc DS on a turntable (not shown).

Figure 2A:
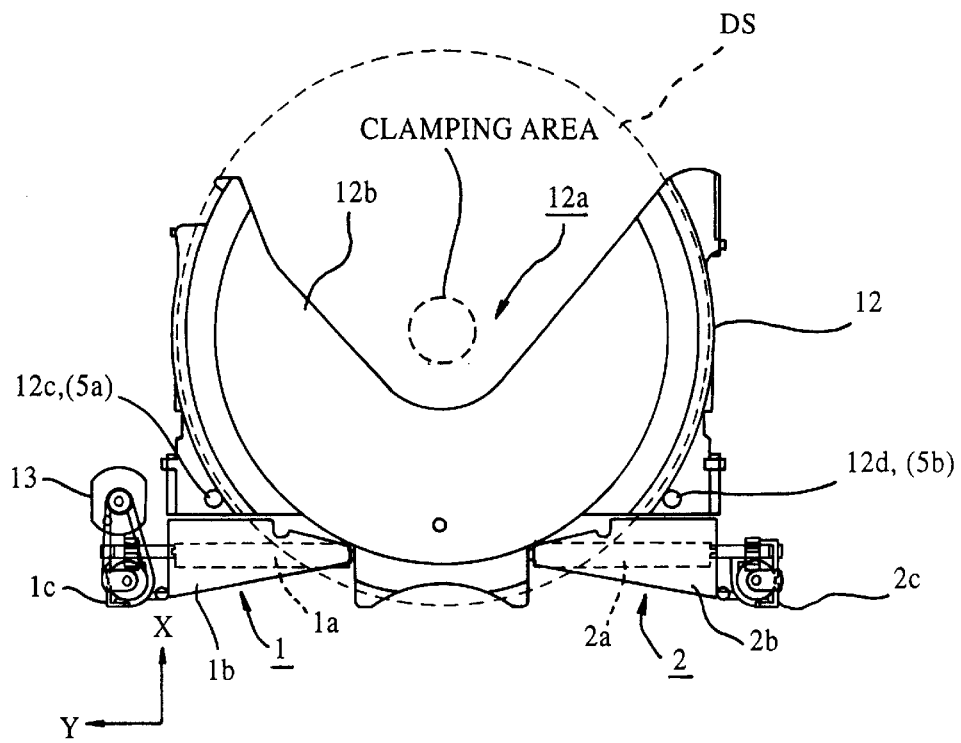
FIGS. 2a and 2b are plan views showing a tray and a CD.

As shown in FIG. 2a, a tray 12 has a disc supporting plate 12b having a V-shaped notch 12a. On the both sides of the plate 12b, there is provided a pair of holes 12c, 12d in which shafts 5a, 5b (FIG. 1) are to be engaged.

In the V-shaped notch 12a, the pickup mechanism 4 and clamping mechanism 3 are to be positioned at the reproduction of the disc DS.

In the present embodiment, six trays 12 are stacked and supported by the shafts 5a, 5b.

An elevating mechanism (not shown) is provided to be engaged with side plates of a lowermost tray so as to elevate the stack of the trays along the shafts 5a, 5b.

Figure 2B:
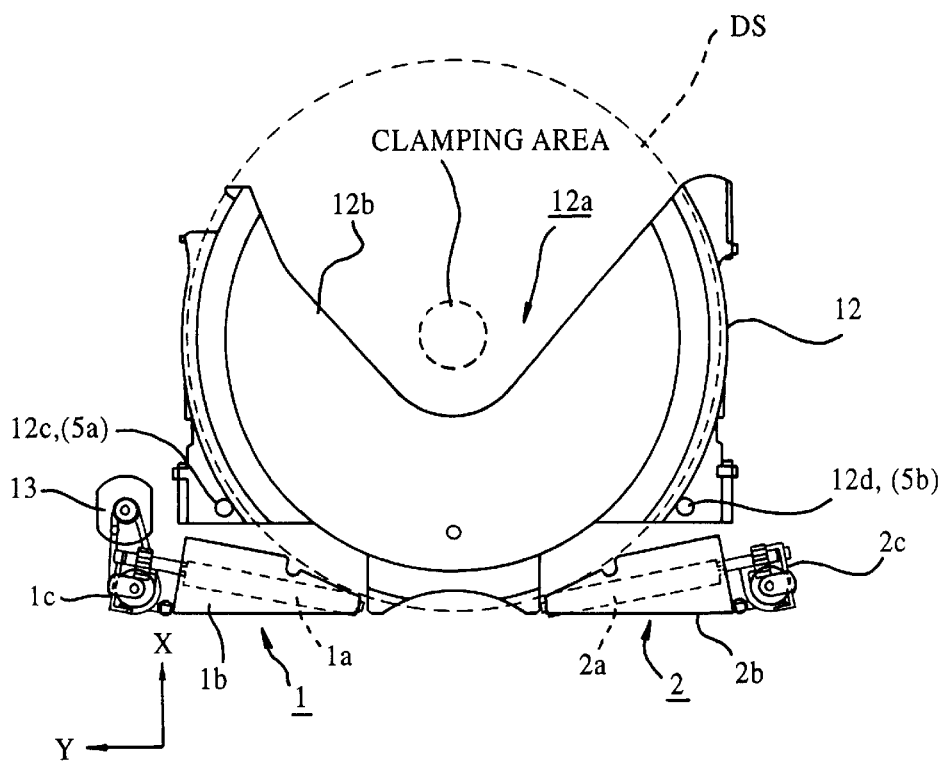

The disc carrying mechanisms 1, 2 are positioned toward the tray in the operating state (FIG. 2a), and retracted in the non-operating state (FIG. 2b) when the trays are vertically moved.

The disc carrying mechanism 1 comprises a roller 1a and an engaging plate 1b. The roller 1a is connected to a rotating shaft of a motor 13 by a transmitting mechanism 1c composed by a gear mechanism and a belt mechanism so as to be rotated.

The disc carrying mechanism 2 has the same construction as the mechanism 1. Thus, when an operation switch is operated, the rollers 1a, 2a are rotated, thereby carrying the disc DS inserted in the front opening and in the space between the rollers 1a, 2a to the turntable and discharging the disc.

Figure 12:
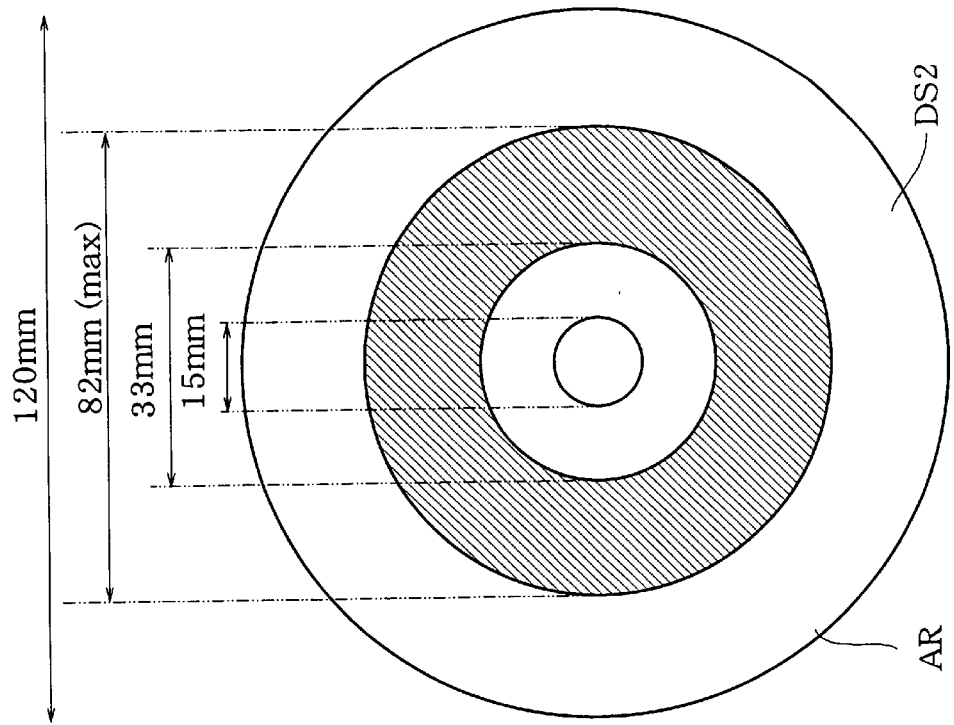
FIGS. 12 to 14 show various discs.
Figure 13:
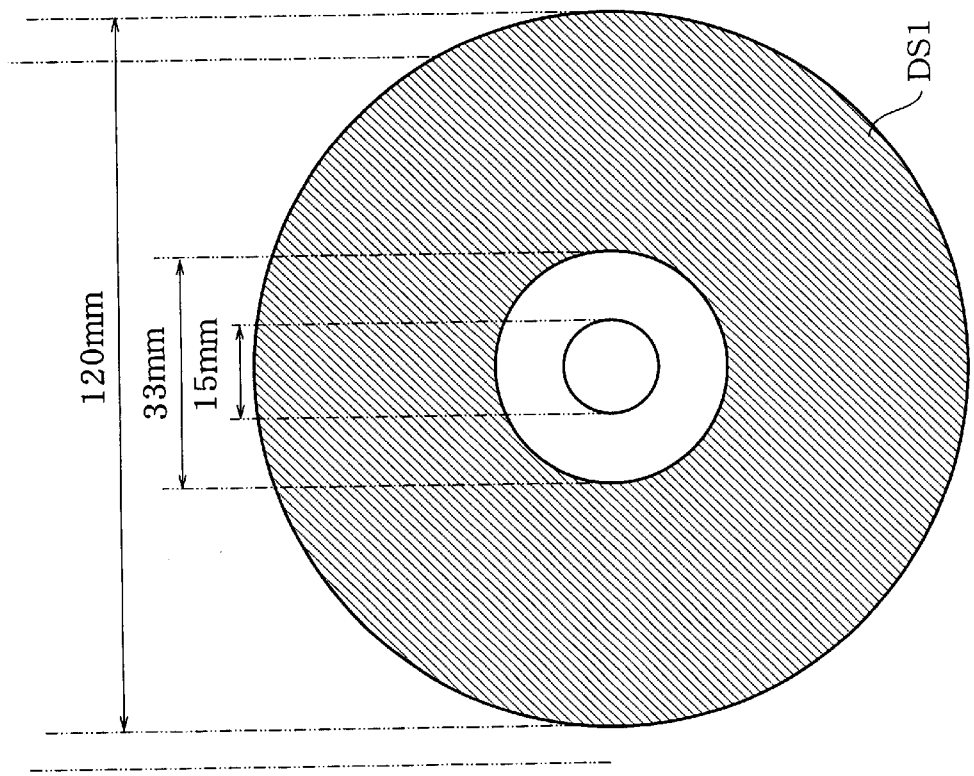
Figure 14:
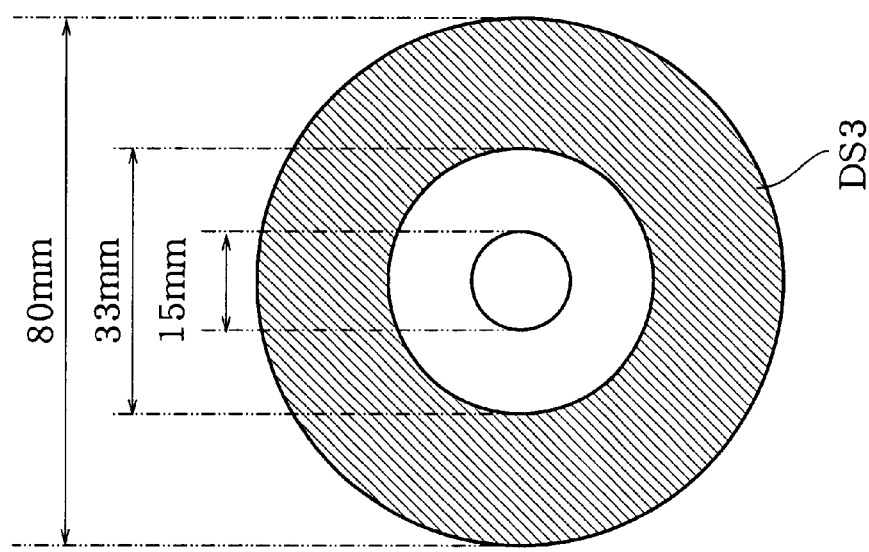

FIG. 12 shows a CD DS1 of 12 cm diameter, FIG. 13 shows a Maxi single CD DS2 of 12 cm diameter, and FIG. 14 shows a CD DS3 of 8 cm diameter.

The 12 cm CD of FIG. 12 has a center hole of 15 mm inner diameter, a clamping area of 33 mm diameter, and a program area between the clamping area and the periphery. The Maxi single CD of FIG. 13 has a same central hole and a clamping area as the 12 cm CD, and a program area between the clamping area and the circle of 50 mm–82 mm. An outside area AR may be transparent or opaque, and may be painted and drawn. The 8 cm CD of FIG. 14 has a same center hole and a clamping area as the 12 cm CD, and an outside program area.

Figure 15:
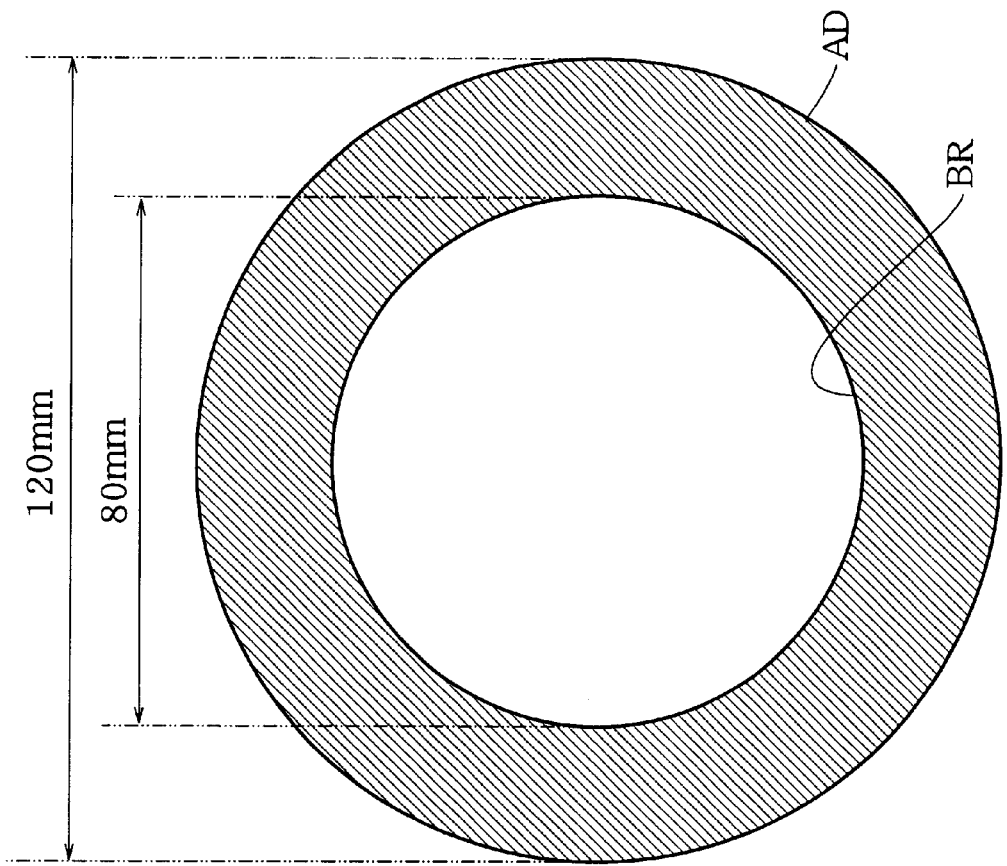
FIG. 15 is a plan view of an adapter.

FIG. 15 shows an adapter AD. The adapter has a 12 cm diameter and a circular hole BR having a diameter of about 80 mm in which the 8 cm CD can be set. Thus, the 8 cm CD can be used as the 12 cm CD with the adapter.

A controller for controlling the disc carrying mechanisms 1, 2 will be described hereinafter with reference to FIGS. 3 and 4.

Figure 3:
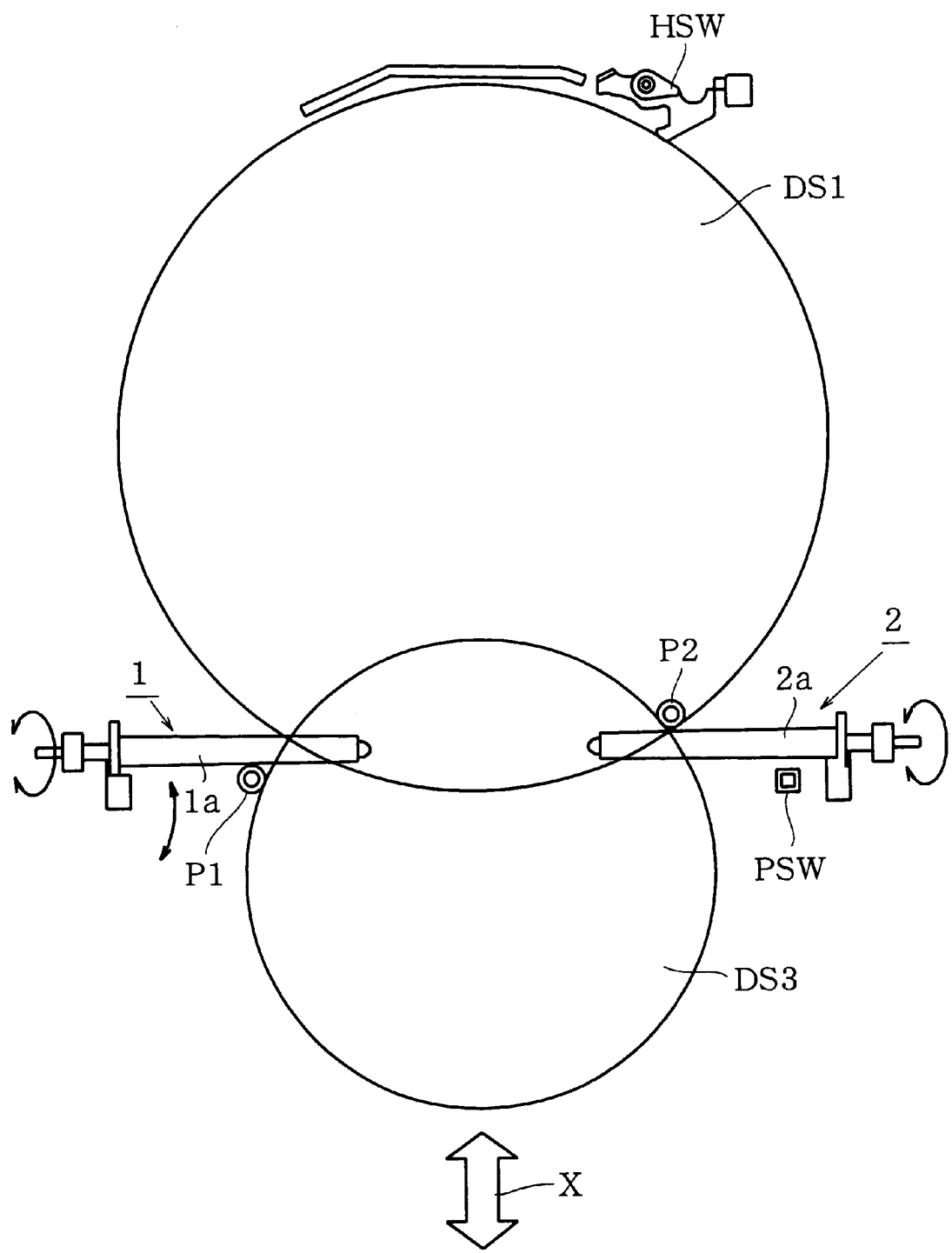
FIG. 3 is a diagram showing an arrangement of photodetectors.

Referring to FIG. 3, there is provided a first photodetector P1 outside the roller 1a, a second photodetector P2 inside the roller 2a, and a mechanical side switch PSW at the disc carrying plane of the roller 2a.

The first and second photodetectors P1 and P2 are disposed at a distance smaller than the diameter of the 8 cm CD. The first photodetector P1 detects the insertion of a CD in order to drive the rollers 1a, 2a, and the second photodetector P2 detects a rear periphery of a discharged CD, thereby stopping the rollers 1a and 2a.

The side PSW contacts with the 12 cm CD between the roller 2a and the engaging plate 2b, thereby detecting the existence of the 12 cm CD. The distance between the first photodetector P1 and the side switch PSW is larger than the diameter of 8 cm CD.

Referring to FIGS. 4a and 4b, each of the photodetectors P1 and P2 comprises a photodiode and phototransistor which are opposed. As shown in the truth table of FIG. 4e, when the phototransistors are closed by the CD, the outputs SP1 and SP2 become high H.

Referring to FIGS. 4c and 4d, when the CD contacts with the switches PSW and HSW, outputs SPSW and SHSW of transistors become low L as shown in FIG. 4f.

Figure 5:
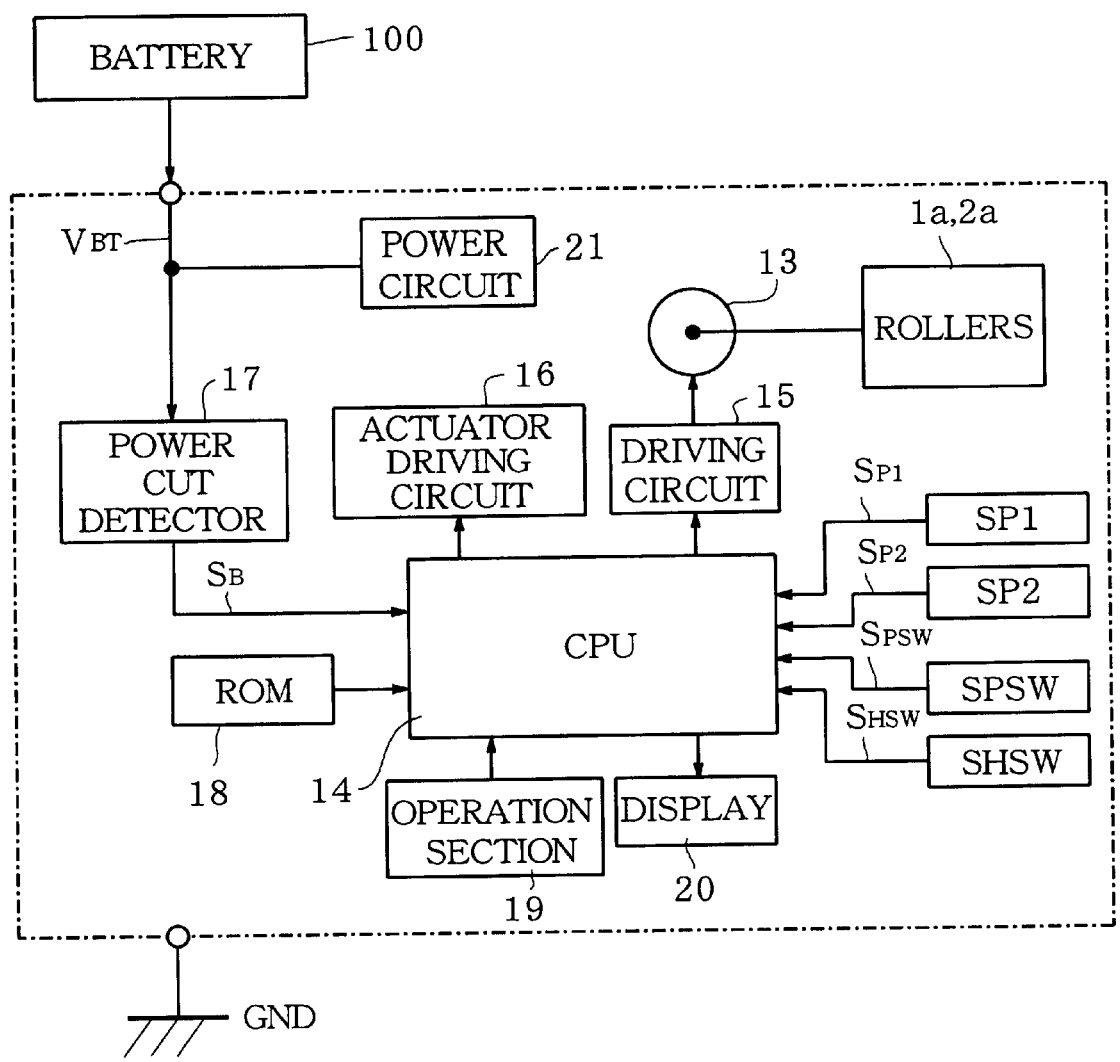
FIG. 5 is a block diagram showing a control circuit for controlling a loading mechanism.

Referring to FIG. 5, the control circuit comprises a CPU 14, roller driving motor 13, motor driving circuit 15, actuator driving circuit 16 for driving the elevating mechanism, spindle motor 4a (FIG. 1) of the pickup 4, temporary power cut off detecting circuit 17, and ROM 18 storing a program for controlling the reproduction system. Furthermore, there is provided a push button operating section 19, display 20 and a power source circuit 21.

The operation for loading discs are described with reference to FIGS. 6 through 9.

Figure 6:
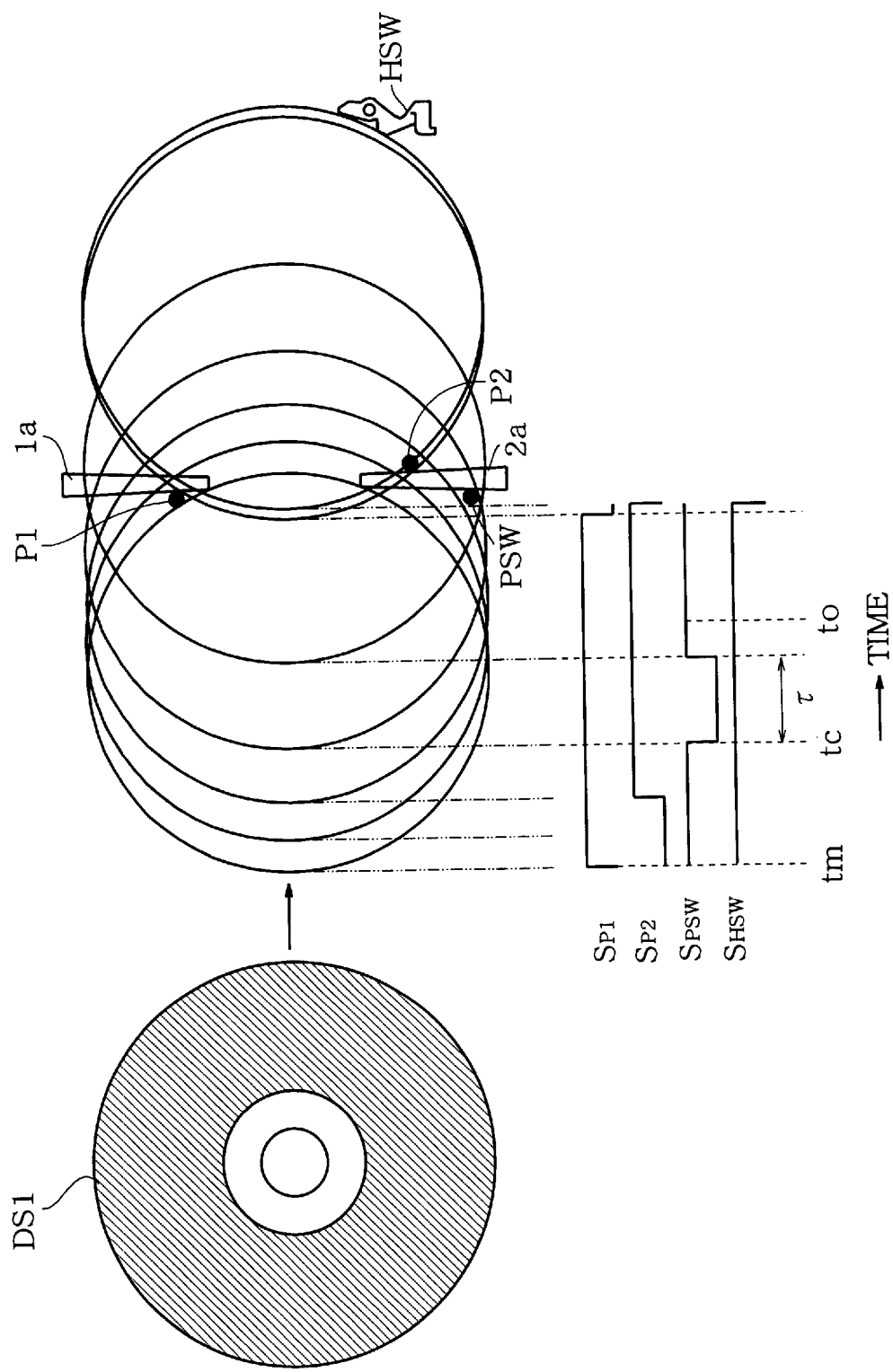
FIGS. 6 to 9 are illustrations for explaining disc loading operation.

Referring to FIG. 6, when the 12 cm CD DS1 or the adapter in which the 8 cm CD DS3 is mounted is inserted in the opening of the reproducing system, the first photodetector P1 detects the inserted CD DS1 earlier than the second photodetector P2. Therefore, the output SP1 becomes H earlier than the output SP2. In response to the output SP1, the CPU 14 operates the driving motor 13 at a time tm so that the carrying rollers 1a, 2a are rotated in the forward direction. Thus, the loading of the CD starts. When the CD closes the side switch PSW, the output SPSW becomes low at a time tc.

When the CD reaches the home position, the home switch HSW is closed, thereby the output SHSW becomes low. In response to the output SHSW, the CPU stops the driving of the rollers 1a, 2a.

Figure 7:
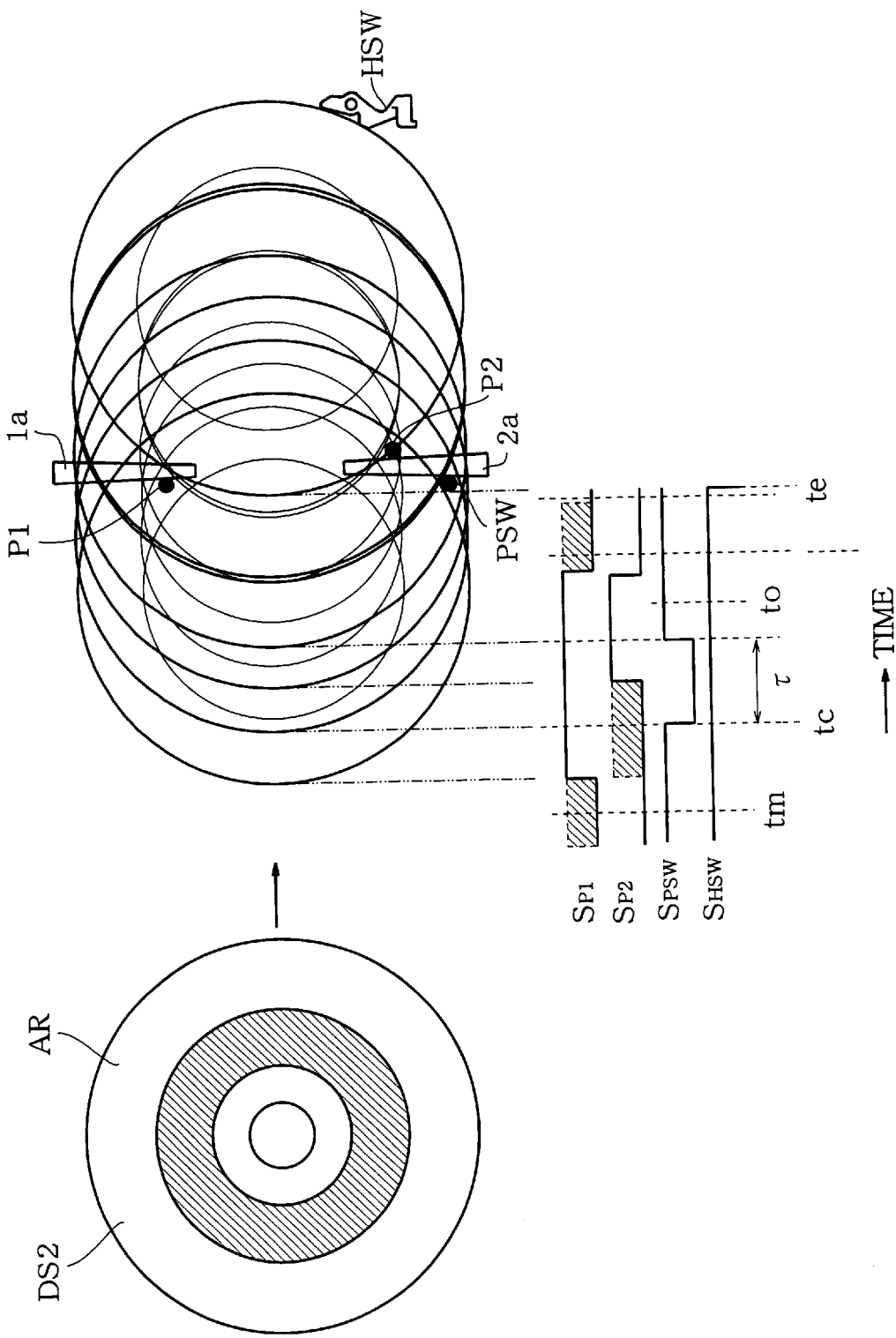

Referring to FIG. 7 when the Maxi single CD is inserted in the opening, the first photodetector P1 detects the inserted CD DS1 earlier than the second photodetector P2. Therefore, the output SP1 becomes H earlier than the output SP2. In response to the output SP1, the CPU 14 operates the driving motor 13 at a time tm so that the carrying rollers 1a, 2a are rotated in the forward direction. Thus, the loading of the CD starts. When the CD closes the side switch PSW, the output SPSW becomes low at a time tc.

When the CD reaches the home position, the home switch HSW is closed, thereby the output SHSW becomes low. In response to the output SHSW, the CPU stops the driving of the rollers 1a, 2a.

Figure 8:
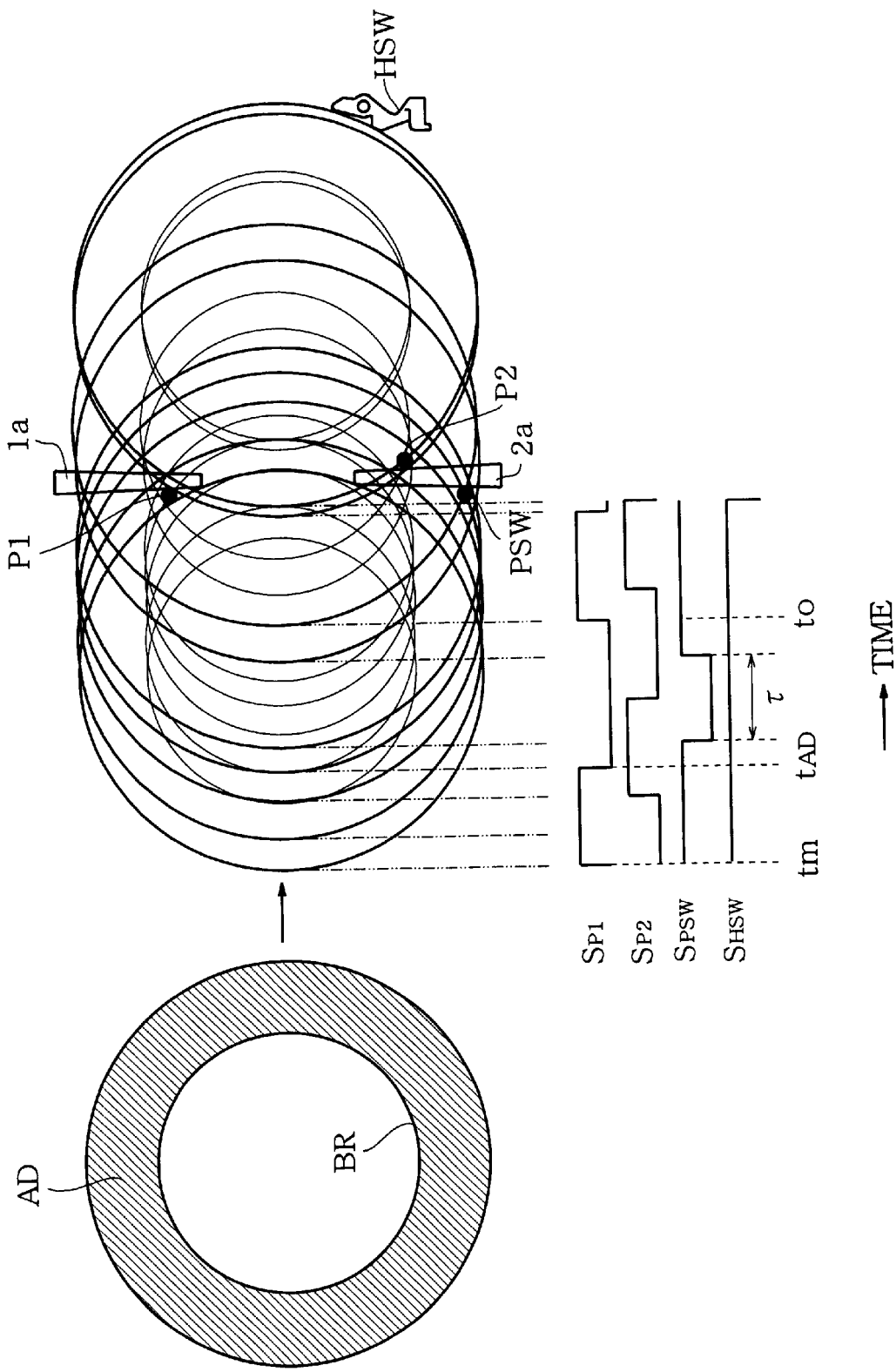

Referring to FIG. 8 when the Maxi single CD is inserted in the opening.

When a Maxi single disc having a transparent outside area AR is inserted, the outputs SP1 and SP2 are produced at positions shown by solid lines in FIG. 7.

Referring to FIG. 8 when an adapter AD on which an 8 cm CD is not mounted is inserted in the opening, the first photodetector P1 detects the inserted adapter AD earlier than the second photodetector P2. Therefore, the output SP1 becomes H earlier than the output SP2. In response to the output SP1, the CPU 14 operates the driving motor 13 at a time tm so that the carrying rollers 1a, 2a are rotated in the forward direction. Thus, the loading of the CD starts.

When the hole BR reaches the first photodetector P1, the output SP1 becomes L at a time tAD. The CPU determines that the adapter without 8 cm CD is inserted based on the fact that the output SP1 becomes low L before the output SPSW.

The CPU operates to rotate rollers 1a, 2a in the reverse direction, thereby discharging the adapter AD.

Figure 9:
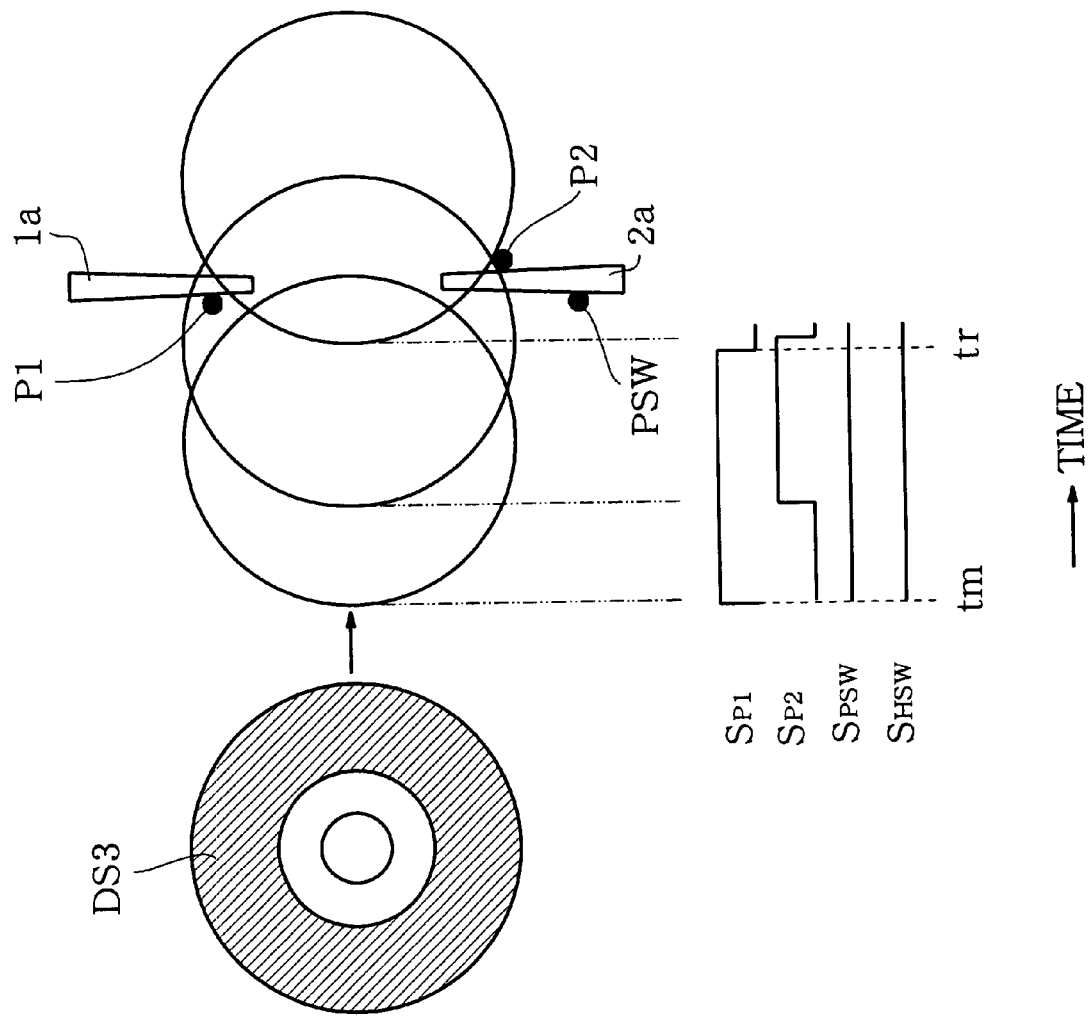

Referring to FIG. 9, when the 8 cm CD DS3 is inserted in the opening, the first photodetector P1 detects the inserted CD DS3 earlier than the second photodetector P2. Therefore, the output SP1 becomes H earlier than the output SP2. In response to the output SP1, the CPU 14 operates the driving motor 13 at a time tm so that the carrying rollers 1a, 2a are rotated in the forward direction. Thus, the loading of the CD starts.

In the case of the 8 cm CD, the output SPSW does not become L, and the output SP1 becomes L. The CPU detects the insertion of the 8 cm CD DS3 based on the fact that the output SP1 becomes low in the condition that the output SPSW is L. Based on the detection of 8 cm CD, the CPU 14 rotates the rollers 1a, 2a in the reverse direction, thereby discharging the 8 cm CD.

The unloading operation will be described with reference to FIG. 10.

When a user instructs the unloading of a desired CD on one of the trays 12, the pickup mechanism 4 and clamp mechanism 3 are returned to the retracted position of FIG. 1, and the stack of trays is vertically moved so that the tray mounting the desired CD is positioned at the rollers 1a, 2a. Thus, the unloading operation starts.

Figure 10:
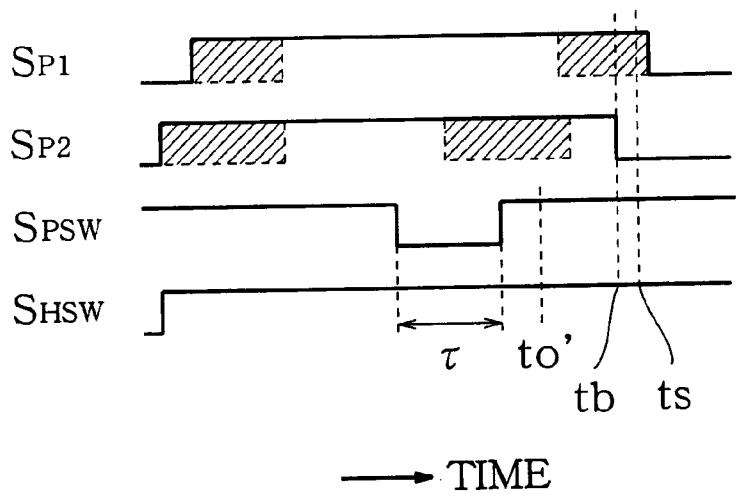
FIG. 10 shows output waveforms of the photodetector and switches.

As shown in FIG. 10, outputs SP1, SP2, SPSW and SHSW are produced when the disc passes the photodetectors P1, P2, switches DSW, HSW.

When the output SPSW becomes L, and the output SP2 becomes L (time tb), the CPU 14 stops the rotation of the rollers 1a, 2a (time ts). As a result, the CD stops in the condition that the CD is gripped by the rollers 1a, 2a and engaging plates 1b, 2b. Therefore, the CD is prevented from falling away from the opening of the reproducing device.

When the user takes out the CD, the output SP1 becomes L. Thus, the unloading of the CD finishes.

In the above described loading operation of the 12 cm CD or the adapter AD mounting the 8 cm CD shown in FIGS. 6 and 7, if the power supplied from a battery 100 (FIG. 5) of the car is temporarily cut or reduced at the starting of the engine of the car, the CD may be stopped in a period τ of FIGS. 6 and 7, where the output SPSW is to be at the low L.

When the period of the temporary cut of power supply ends and the power is supplied to the reproducing system, the CD is carried thereby the output SPSW becomes H. Next, when the output SP1 becomes L, the condition is equal to the condition of the 8 cm CD at the time tr of FIG. 9. Therefore, the CPU 14 misjudges the CD as the 8 cm CD, so that the 12 cm CD or the adapter is discharged.

The present invention is to resolve such trouble.

Figure 11:
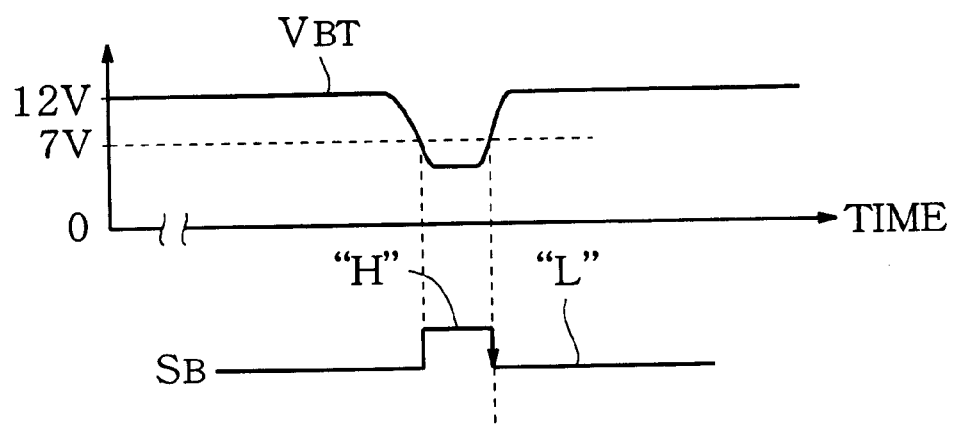
FIG. 11 shows a waveform of a detector.

When the power supply is temporarily cut during the loading or unloading of the CD, the temporary power cut detection circuit 17 of FIG. 5 detects the reduction of the voltage VBT of the power and produces a cut signal SB at a high level as shown in FIG. 11.

In the loading operation, in response to the signal SB, the CPU 14 operates to rotate the rollers 1a and 2a in the reverse direction after the recovery of the power supply, so that the CD is carried in the discharge direction. When the CD passes the photodetector P2 and the output SP2 becomes L, the CPU operates to rotate the rollers 1a and 2a in the feeding direction. When the home switch HSW is operated by the CD and the output SHSW becomes L, the rotation of the rollers are stopped. Thus, the CD is loaded on the turntable, and the CD is normally reproduced.

In the unloading operation, in response to the signal SB, the CPU 14 operates to rotate the rollers 1a and 2a in the forward direction after the recovery of the power supply, so that the CD is carried in the loading direction. When the CD contacts with the home switch HSW and the output SHSW becomes L, the CPU operates to rotate the rollers 1a and 2a in the reverse direction. When the CD passes the photodetector P2, and the output SP2 becomes L, the rotation of the rollers are stopped. Thus, the CD is unloaded from the system.

In accordance with the present invention, if the power supply is temporarily cut during loading or unloading, the CD is normally carried after resupply of the power.

What is claimed is:

1. A system for reproducing a recording medium, the system having a reproducing device, a carrying device for carrying a recording medium inserted in an opening of the system to the reproducing device, the system comprising:
   a first detector for detecting the recording medium inserted in the opening and for producing a first signal;
   a second detector provided on the reproducing device for detecting the recording medium reached in the reproducing device and for producing a second signal;
   sensing means for sensing a temporary reduction of a voltage of power supplied to the system and for producing a temporary reduction signal;
   control means responsive to the first signal for operating the carrying device to carry the recording medium in a loading direction, and responsive to the temporary reduction signal during a loading operation for operating the carrying device to carry the recording medium in an unloading direction after a recovery of the power supply and then in a loading direction when the recording medium reaches a predetermined first position.

2. The system according to claim 1, wherein the control means is provided to be responsive to the temporary reduction signal during an unloading operation for operating the carrying device to carry the recording medium in the loading direction after the recovery of the power supply and then in the unloading direction when the recording medium reaches a predetermined second position.

3. The system according to claim 2, wherein the second detector is positioned for detecting the recording medium being at the second predetermined position.

4. The system according to claim 1 further comprising a third detector provided for detecting the recording medium being at the predetermined first position.

5. The system according to claim 4, wherein the third detector is disposed at a position closer than the first detector to the reproducing device.

6. A system for reproducing a recording medium, comprising:
   a reproducing device for reproducing the recording medium;
   a carrying device for loading the recording medium to the reproducing device and for unloading the recording medium from the reproducing device;
   an existence detector for detecting a presence of the recording medium at a specified location under a state of loading or unloading;
   a sensor for sensing a reduction of a voltage of power supplied to the system; and
   a controller for controlling the carrying device in response to the existence detector and the sensor;
   wherein the controller controls the carrying device to carry the recording medium in an unloading direction when the sensor senses the reduction of the voltage and the existence detector detects the presence of the recording medium while the carrying device loads the recording medium toward the reproducing device, and then in a loading direction toward the reproducing device after the existence detector detects no presence of the recording medium at the specified location.

7. The system according to claim 6,
   wherein the controller controls the carrying device to carry the recording medium in a loading direction until the existence detector detects no presence of the recording medium within the loading space when the sensor senses the reduction of the voltage, while the carrying device unloads the recording medium from the reproducing device; and
   wherein the controller controls the carrying device to carry the recording medium in an unloading direction from the reproducing device after the existence detector detects no presence of the recording medium within the loading space.

8. The system according to claim 6 further comprising:
   a loaded detector for detecting the recording medium received in the reproducing device;
   wherein the controller controls the carrying device to carry the recording medium in a loading direction until the loaded detector detects the recording medium received in the reproducing device when the sensor senses the reduction of the voltage, while the carrying device unloads the recording medium from the reproducing device; and
   wherein the controller controls the carrying device to carry the recording medium in an unloading direction from the reproducing device after the loaded detector detects the recording medium received in the reproducing device.

9. The system according to claim 6 further comprising:

an inserted detector for detecting the recording medium from an opening of the system;

an inserted detector for detecting the recording medium from an opening of the system;

wherein the controller controls the carrying device to start to carry the recording medium in a loading direction until the existence detector detects no presence of the recording medium.

10. A system for reproducing a recording medium, comprising:

a reproducing device for reproducing the recording medium;

a carrying device for loading the recording medium to the reproducing device and for unloading the recording medium from the reproducing device;

an existence detector for detecting a presence of the recording medium at a specified location under a state of loading or unloading;

a sensor for sensing a reduction of a voltage of power supplied to the system; and a controller for controlling the carrying device in response to the existence detector and the sensor;

wherein the controller controls the carrying device to carry the recording medium in a loading direction after a recovery of the power supply when the sensor senses the reduction of the voltage, while the carrying device unloads the recording medium from the reproducing device, and then in an unloading direction from the reproducing device after the existence detector detects no presence of the recording medium at a specified location.

11. The system according to claim 10 further comprising:

an inserted detector for detecting the recording medium from an opening of the system;

wherein the controller controls the carrying device to start to carry the recording medium in a loading direction until the existence detector detects the nonexistence of the recording medium.

12. A system for reproducing a recording medium, comprising:

a reproducing device for reproducing the recording medium;

a carrying device for loading the recording medium to the reproducing device and for unloading the recording medium from the reproducing device;

a loaded detector for detecting the recording medium reached in the reproducing device;

a sensor for sensing a reduction of a voltage of power supplied to the system; and a controller for controlling the carrying device in response to the existence detector and the sensor;

wherein the controller controls the carrying device to carry the recording medium in a loading direction until the loaded detector detects the recording medium received in the reproducing device when the sensor senses the reduction of the voltage while the carrying device unloads the recording medium from the reproducing device; and wherein the controller controls the carrying device to carry the recording medium in an unloading direction from the reproducing device after the loaded detector detects the recording medium received in the reproducing device.

13. A method for loading a recording medium to a reproducing device of a system by a carrying device, comprising:

(A) carrying the recording medium in a loading direction toward the reproducing device;

(B) detecting a reduction of a voltage of power supplied to the system and detecting the presence of the recording medium at a specified location during the operation (A);

(C) carrying the recording medium in an unloading direction when the reduction of the voltage is detected;

(D) detecting no presence of the recording medium at a specified location during the operation (C);

(E) carrying the recording medium in a loading direction to the reproducing device after no presence of the recording medium is detected.

14. A method for unloading a recording medium from a reproducing device of a system by a carrying device, comprising:

(E) carrying the recording medium in an unloading direction from the reproducing device;

(F) detecting a reduction of a voltage of power supplied to the system and detecting the presence of the recording medium at a specified location during the operation (E);

(G) carrying the recording medium in a loading direction when the reduction of the voltage is detected;

(H) detecting no presence of the recording medium at a specified location during the operation (G);

(I) carrying the recording medium in an unloading direction from the reproducing device after no presence of the recording medium is detected.

15. A method for unloading a recording medium from a reproducing device of a system by a carrying device, comprising:

(J) carrying the recording medium in an unloading direction from the reproducing device;

(K) detecting a reduction of a voltage of power supplied to the system during the operation (J);

(L) carrying the recording medium in a loading direction when the reduction of the voltage is detected;

(M) detecting the recording medium reached in the reproducing device during the operation (L);

(N) carrying the recording medium in an unloading direction from the reproducing device after the recording medium is received in the reproducing device.

\* \* \* \* \*